(12) United States Patent
Zagha

(10) Patent No.: US 8,390,204 B1
(45) Date of Patent: Mar. 5, 2013

(54) AUTOMATED MEMORIAL SYSTEM

(76) Inventor: Maurice Zagha, Manalapan, NJ (US)

( * ) Notice: Subject to any disclaimer, the term of this patent is extended or adjusted under 35 U.S.C. 154(b) by 436 days.

(21) Appl. No.: 12/702,279

(22) Filed: Feb. 8, 2010

Related U.S. Application Data

(60) Provisional application No. 61/151,146, filed on Feb. 9, 2009.

(51) Int. Cl.
*H05B 37/02* (2006.01)
(52) U.S. Cl. .......................... 315/153; 315/133
(58) Field of Classification Search .................. 315/149, 315/152, 153, 129, 130, 133
See application file for complete search history.

(56) References Cited

U.S. PATENT DOCUMENTS

| | | | |
|---|---|---|---|
| 5,013,972 A | 5/1991 | Malkieli et al. | |
| 7,835,935 B2 * | 11/2010 | Danninger | 705/7.19 |
| 2004/0225969 A1 * | 11/2004 | Droegemueller et al. | 715/804 |
| 2005/0256725 A1 * | 11/2005 | Harris | 705/1 |
| 2009/0254831 A1 | 10/2009 | Dolny et al. | |
| 2010/0026086 A1 | 2/2010 | Siegel et al. | |
| 2011/0010660 A1 * | 1/2011 | Thorson et al. | 715/790 |
| 2012/0054190 A1 * | 3/2012 | Peters | 707/741 |
| 2012/0224459 A1 | 9/2012 | Rosenshen et al. | |

* cited by examiner

*Primary Examiner* — Don Le
(74) *Attorney, Agent, or Firm* — Volpe and Koenig, P.C.

(57) ABSTRACT

A memorial display system is described including at least one memorial device having a plurality light fixtures with each light fixture having at least one light source. Each of the light sources are in electrical communication with a controller circuit that automatically activates and deactivates the at least one light source of each light fixture according to at least one anniversary date and for a duration period stored in the memory. In one embodiment, each light source is part of a light bar with up to 5 lights. The light bars are commonly strung together to create various runs of lighting opportunities allowing for different overall sizes of the automated memorial system.

28 Claims, 13 Drawing Sheets

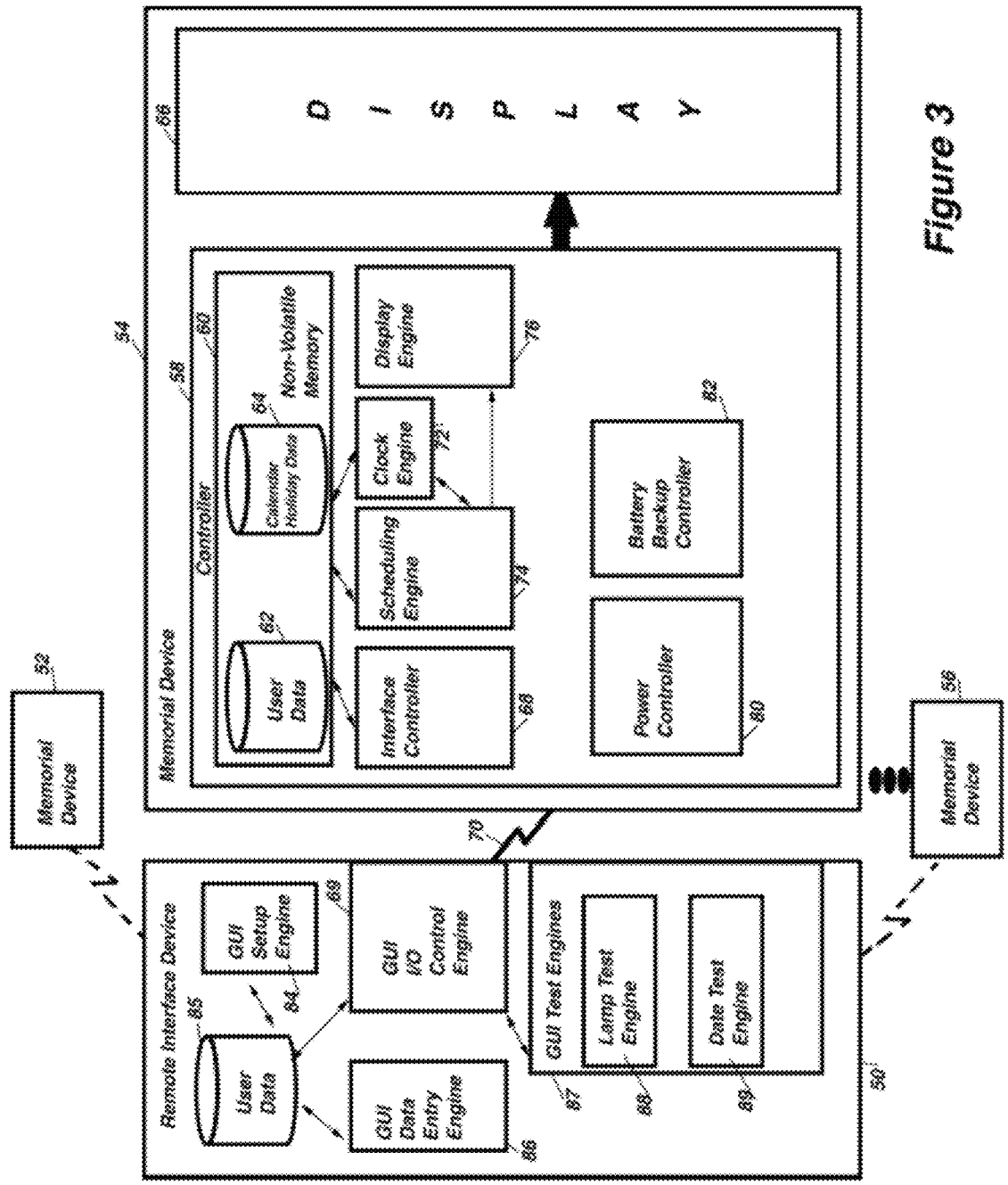

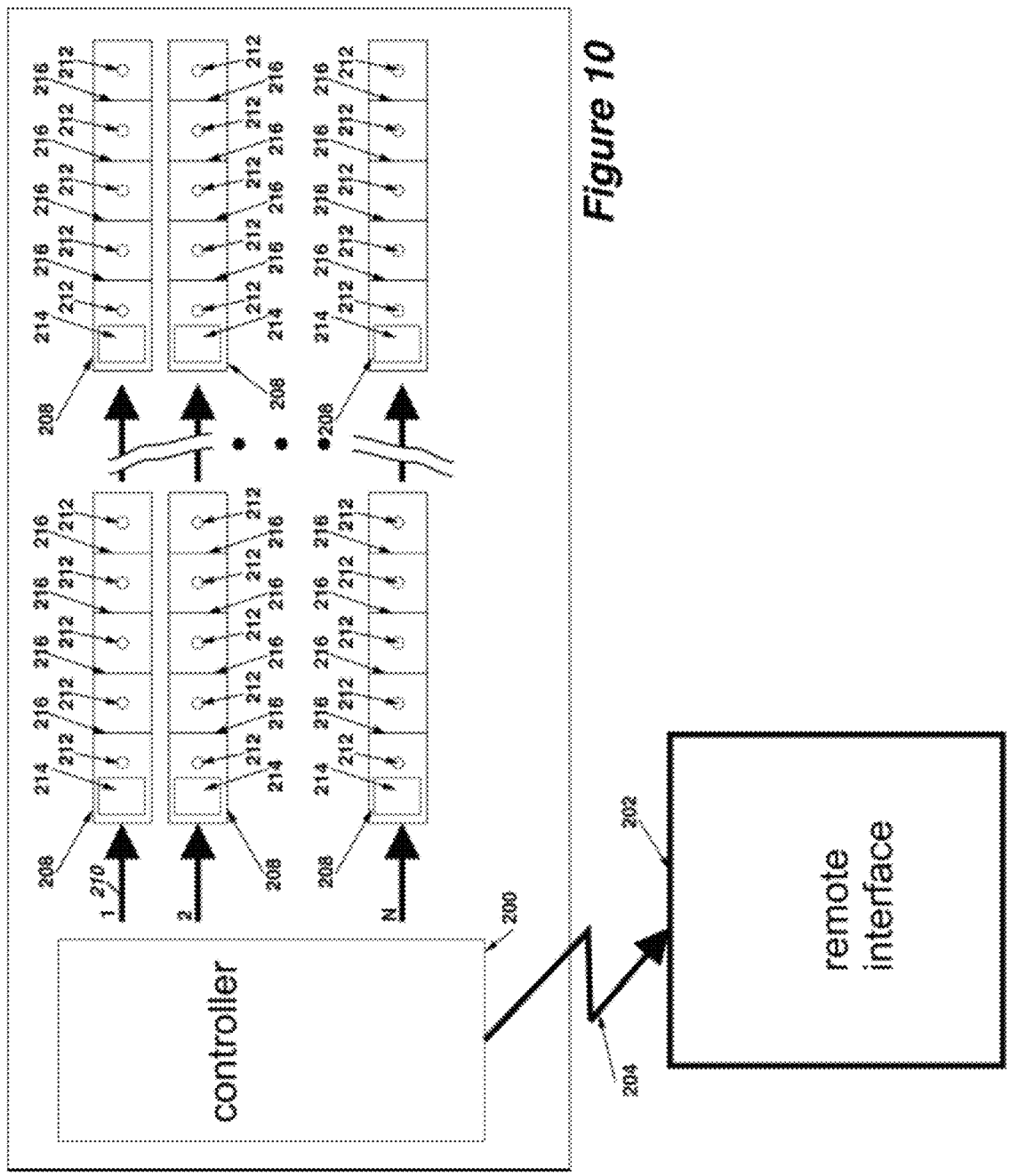

AUTOMATED MEMORIAL SYSTEM

CROSS-REFERENCE TO RELATED APPLICATION(S)

This application claims the benefit of co-pending U.S. provisional application Ser. No. 61/151,146 filed on Feb. 9, 2009, which is incorporated herein by reference.

BACKGROUND OF THE INVENTION

1. Field of the Invention

This invention relates generally to anniversary reminder systems, and, more particularly, to a centralized system for automatically tracking multiple anniversaries.

2. Description of the Related Art

Throughout the world and in connection with many secular as well as religious traditions, a lighted candle is often associated with an anniversary or a time of remembrance, reflection or prayer. Often, the passing of an anniversary or time of remembrance results in the lighting of a candle. In some Christian faiths, votive candles may be lit to represent a time of remembrance or prayer. In Judaism, the anniversary of the death of a parent or close relative, commonly observed by burning a candle for an appropriate period of remembrance, is known as 'Yahrzeit'.

With the advent of modern building codes and safety considerations, the lit candles have been replaced by lighting devices using safer forms of illumination such as electric light bulbs instead of candles. In some cases these lighting devices are manufactured to emulate the look and feel of the candle arrangements that are being replaced. In other instances, the lighting devices have allowed for designs that permit greater utility while providing space saving and display improvements to enhance the decorative elements. For example, electronic memorial boards have been in use for some time by congregations practicing yahrzeit to provide a central location for remembering those deceased individuals from the community in which a plaque or nameplate conveying information about each individual is affixed to the memorial board and associated with at least one light bulb that is lit during the appropriate time period of remembrance. The conventional electronic memorial boards are wired to provide electricity to a plurality of conventional electric light bulb sockets, such as, Edison threaded screw-in sockets wherein each socket may receive a like threaded light bulb that is screwed into the socket until electrical contact is made. Often these conventional systems operate to activate or deactivate a light bulb by unscrewing the bulb within the socket sufficiently so as to create an open circuit while maintaining the light bulb within the socket. Such an activation system requires that at appropriate times when a remembrance period begins or ends, such as at sun down, an operator must manually screw or unscrew light bulbs on the memorial board to honor the appropriate beginning or ending of the remembrance period of the individuals listed on the memorial board. Furthermore, for certain holidays it may be required that some or all of the lights be illuminated for a certain time period that is different from the anniversary date remembered.

It will be appreciated that in large congregations, large numbers of individuals can be displayed on one or more such memorial boards, and the task of managing the appropriate illumination of light bulbs for the individuals can be time consuming and error prone where such errors can result in the failure to illuminate the appropriate individual at the appropriate time. Compounding the problem with maintaining the appropriate illumination of lights is the life cycle of the traditional incandescent bulbs used in a conventional memorial board that can result in a loss of illumination when the end of the life cycle is reached. Unless, a bulb fails to illuminate at the time it is manually activated, there is no easy way to detect when a bulb that should be lit has reached the end of its life cycle without periodically manually checking each bulb in the one or more memorial boards. As the light bulbs are each subject to individual and manual activation, there is no easy way to quickly check whether an individual bulb has gone out and requires replacement.

Thus, the need exists for a way to improve the methods for lighting individual memorial lights and to improve the diagnostic methods to ensure individual operation of each of the lights.

SUMMARY OF THE INVENTION

A memorial display system including at least one memorial device having a plurality light fixtures with each light fixture having at least one light source. Each of the light sources are in electrical communication with a controller circuit that automatically activates and deactivates the at least one light source of each light fixture. The controller circuit includes memory having at least one anniversary date that corresponds to at least one light fixture and an anniversary duration indicating the time period that the anniversary is observed. The controller circuit is operative to illuminate the light fixture corresponding to the anniversary date and for the duration period stored in the memory. The at least one memorial device includes at least one plaque having indicia printed near the at least one light fixture wherein the indicia provides anniversary information. The controller circuit further includes a display engine for illuminating the at least one light fixture. Furthermore, the display engine upon power initiates a diagnostic sequence that illuminates all light fixtures.

Additionally the memorial display system includes a remote interface device that includes engines to provide user data to the controller circuit including anniversary date information. A communications link connects the remote interface device to the memorial device controller circuit.

Also, the controller also illuminates the light fixture with an associated name during the 4 holidays on the Jewish calendar where Yahrzeit is additionally observed.

In another aspect of the present invention, the remote interface device includes diagnostic tools for testing the memorial device including testing of at least one light source and the implementation of anniversary dates to activate the at least one light source at appropriate times.

Furthermore, in one embodiment, each light source is part of a light bar with up to 5 lights. The light bars are commonly strung together to create various runs of lighting opportunities allowing for different overall sizes of the automated memorial system.

BRIEF DESCRIPTION OF THE DRAWINGS

Other aspects, advantages and novel features of the invention will become more apparent from the following detailed description of the invention when considered in conjunction with the accompanying drawings wherein:

FIG. 3 is a functional block diagram of a memorial system according to the present invention;

FIG. 10 is a diagrammatic view of a display circuit including configurable light bars of the memorial device of FIGS. 1A&B

DETAILED DESCRIPTION

Figure 1A:
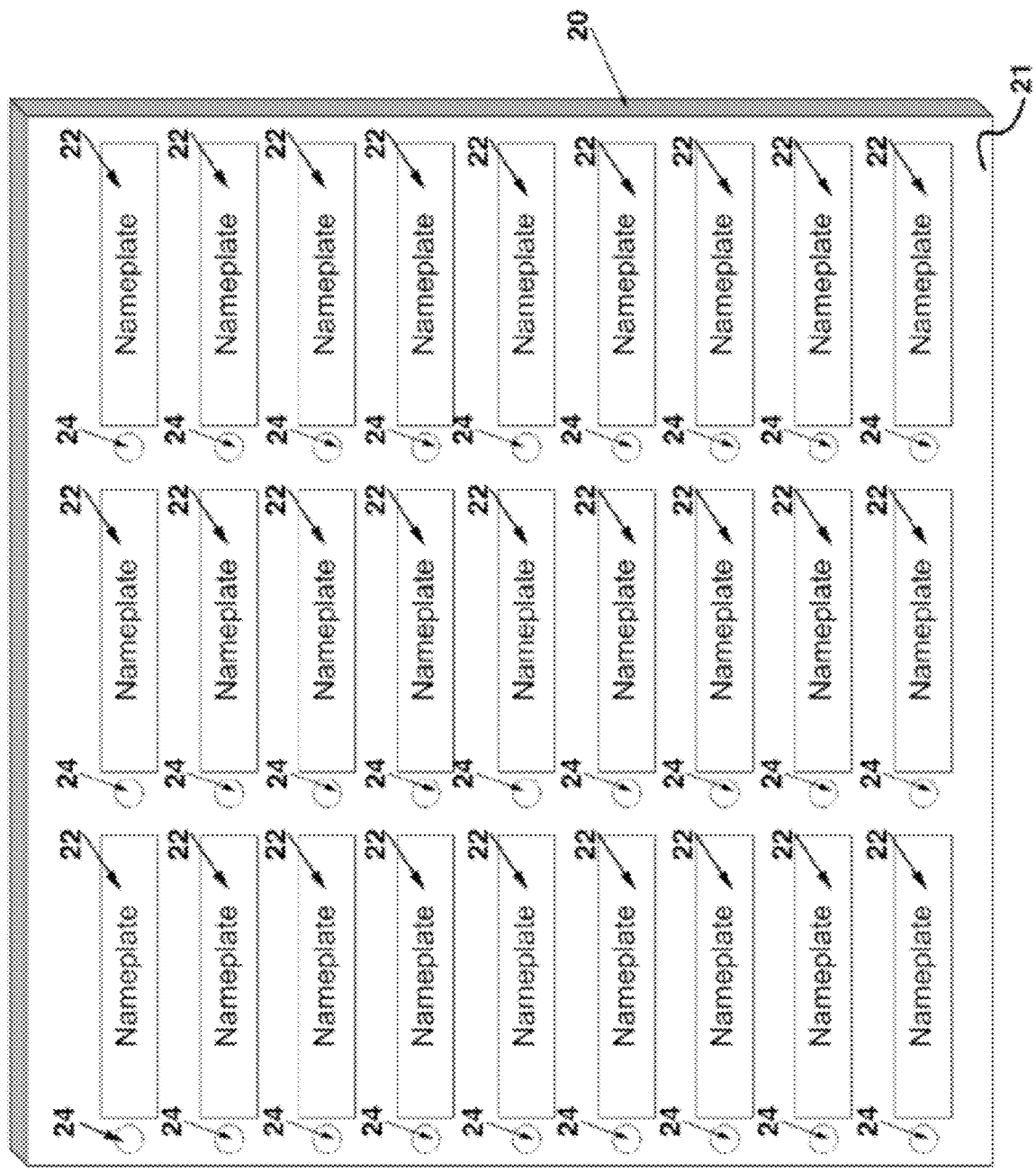
FIG. 1A is a diagrammatic view of a memorial device according to the present invention.

With reference to the drawings for purposes of illustration, a memorial device 20 (FIG. 1A) having a housing 21 includes a plurality of nameplates 22 and associated light fixtures 24 configured conventionally in rows and columns on a front surface of the housing. Advantageously, each light fixture includes at least one low voltage light source such as a light emitting diode (LED).

Figure 1B:
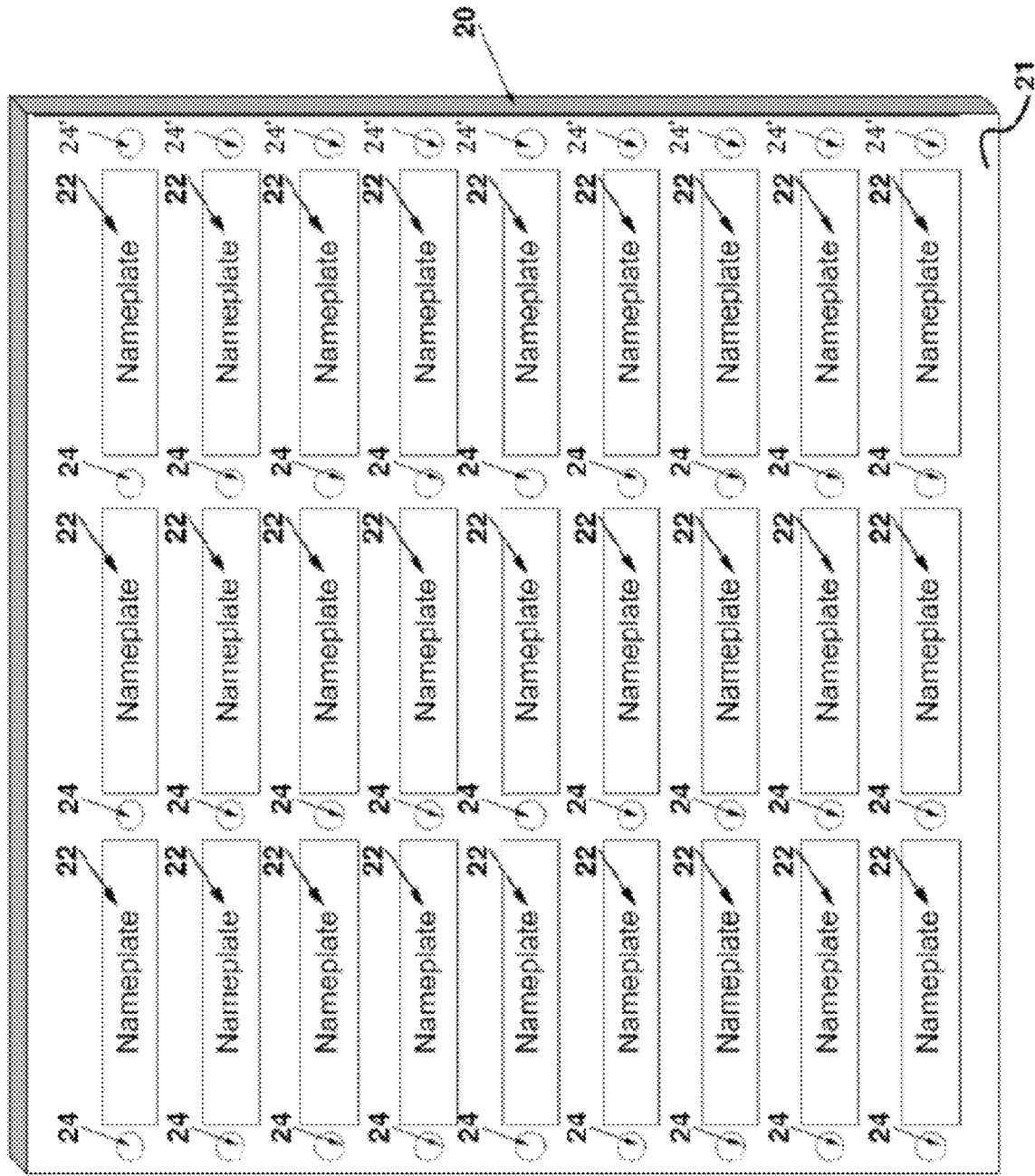
FIG. 1B is an alternate diagrammatic view of a memorial device according to the present invention.

Similarly, a memorial device 20 (FIG. 1B) having a housing 21 includes a plurality of nameplates 22 and associated light fixtures 24 configured conventionally in rows and columns on a front surface of the housing. Additionally, one extra column of light fixtures 24' is provided to permit illumination either or both sides of any nameplate. As in FIG. 1A, advantageously, each light fixture includes at least one low voltage light source such as a light emitting diode (LED).

While shown and described in a conventional ornamentation, the memorial device 20 according to the present invention should not be limited to these configurations. Other configurations may include arrangements of the light fixtures and nameplates in any configuration rather than equal rows and columns without departing from the present invention, such as, but not limited to, arrangements allowing for placement of light fixtures and nameplates in geometric shapes and other ornamental configurations that enhance the viewing of memorial device. Furthermore, the memorial device may be formed into a wall decoration or stand-alone sculpture such that the wall of a building or a sculpture can be considered the housing of the memorial device without departing from the present invention.

The nameplates, while preferably presented in a material in keeping with the ornamental design, are formed from materials including metal, wood, glass and plastic, such as, but not limited to, brass, bronze, stainless steel, aluminum or silver, wood, acrylic and glass which and includes engraved, laminated or screened indicia or may include etched indicia on clear or opaque plastic or glass. In many instances, the nameplates are removably affixed near an associated light fixture and may be affixed by any conventional means, such as, but not limited to, screws, adhesive, hook and loop material, magnetic mounts and other mechanical means for affixing a nameplate to a surface. In an alternate embodiment, the indicia rather than the nameplate may be interchangeable such as including the indicia on a removable film affixed to the nameplate or incorporating a nameplate with an electronic display, such as, but not limited to a liquid crystal display (LCD) or LED.

The light fixtures as well may be configured according to any desired ornamental design. While preferably including at least one low voltage light source, the light fixture may display the light source exposed or through an optional light transmissive cover that may be clear or shaded cover as desired by the overall design. Furthermore, multiple light sources may be included in the light fixture to provide variations in light intensity or where each light source produces a different light color to indicate different information. Furthermore, two light sources when pulsed on and off may be used cooperatively to provide a changing light intensity pattern emulating a light flickering candle. It will be appreciated by those skilled in the art, that these variations in the memorial device may be implemented in any combination or configuration without departing from the present invention. However, in general, a sufficient visual association should be maintained between the light fixture and associated nameplate to discern the pairing of each light fixture to a nameplate.

Figure 2:
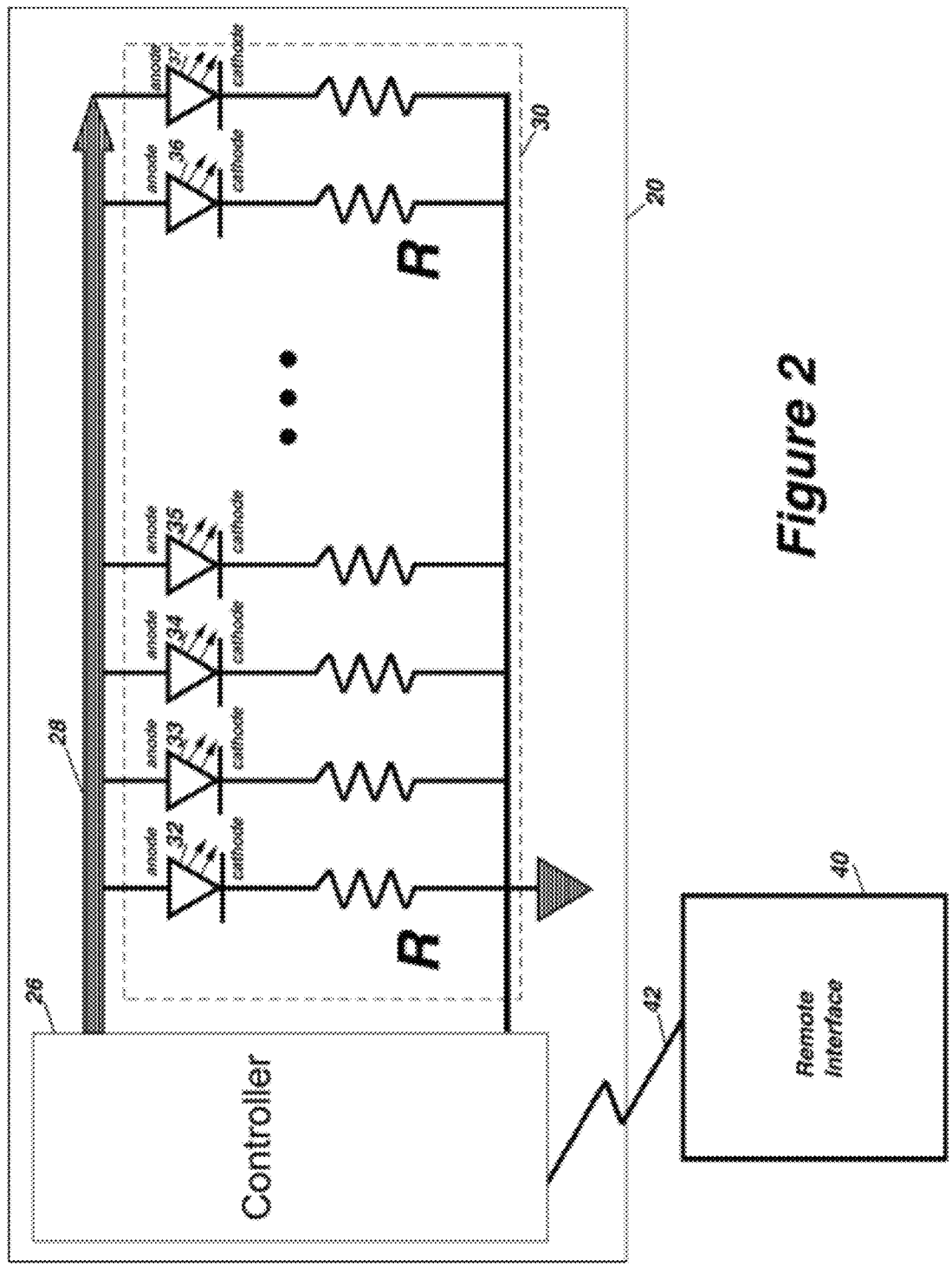
FIG. 2 is a diagrammatic view of a display circuit of the memorial device of FIG. 1.

With reference to FIG. 2, a general circuit design for a memorial device 20 includes a controller circuit 26 connected in circuit via a wire bundle 28 to a display circuit 30 having a plurality of individually addressable LED circuits 32-37, wherein each LED corresponds to a light source. Each LED circuit includes an LED having an anode connected to the bus for receiving power from the controller circuit and a cathode that connects to a common ground through a resistor to provide balanced load potential. The controller circuit 26 is connectable to a remote interface device 40 used to configure and test the operation of the controller circuit via a communications link 42.

With reference to FIG. 3, the remote interface device 50 can sequentially connect to and manage a plurality of memorial devices 52, 54 and 56.

Each memorial device 54 includes in the controller circuit 58 a non-volatile memory 60 for storing user configuration data 62 and calendar and holiday data 64 and following an initial user set up to upload the user data, the controller circuit 58 is able to operate the display engine 66 automatically and without further user interaction. In the presently preferred embodiment, an interface controller 68 connects with an I/O control engine 69 of the remote interface device 50 via the communications link 70. The interface controller 68 receives and transmits data between the remote interface device 50 and the non-volatile memory 60 to up load user data 62 and trigger diagnostic tests of the display circuit and a clock engine 72. In the presently preferred embodiment, the interface controller communicates with the remote interface device via a two lead serial communications link of the type such as an RS-232 serial link. The clock engine 72 maintains uses internal clock to maintain accurate time and date information using the calendar and holiday data 64 stored in the non-volatile memory 60. The clock engine 72 is capable of maintaining the time and date using the widely accepted Gregorian calendar system along with dates appropriate for a geographic location appropriate for switching between daylight savings time and standard time. Furthermore, the clock engine 72 is capable of maintaining a date and time in another format appropriate for tracking anniversaries recorded under at least one other world calendar systems. Alternate calendar systems of the type suitable for this purpose, include, but are not limited to, the Greek Orthodox calendar, the Hebrew Calendar, the Persian calendar and the Chinese calendar. In a presently preferred embodiment the at least one other world calendar system used is the Hebrew calendar, although multiple world calendar systems may be used.

The user data includes a table with a data record for each light fixture 24 (FIG. 1) controlled in the display. Where each light fixture 24 has one or more light sources 32-37 (FIG. 2) contained therein. The user data 62 (FIG. 3) includes a name field and a date field that is associated with each light fixture 24 (FIG. 1). This information associates the light fixture with an individual and memorial date. Furthermore, the user data may include global information such as, but not limited to, the number of light sources to be activated for each light fixture, the number of light fixtures to be activated, the light source brightness and the light source duration.

In a presently preferred embodiment utilizing the Hebrew Calendar and Holidays, each light fixture is associated with the passing of an individual and includes the name and date of death. The light source brightness level varies in a range from 1 to 8 brightness levels and may varied according to whether the memorial device is located in a low light area or bright light area. The light source duration is presently configured to operate in six universal modes of duration, namely, 1) On Yahrzeit day Only: Light the Yahrzeit day only ending at the end of the yahrzeit observance
2) Starting 7 days before Yahrzeit: Light 7 days before the yahrzeit ending at the end of the yahrzeit observance
3) Starting Shabbat before Yahrzeit: Light the Shabbat before the yahrzeit ending at the end of the yahrzeit observance
4) Friday at sundown to Friday at sundown: Light Friday at sundown to Friday at sundown—for the current week Yahrzeits (Full week)
5) Friday at sundown to end of Shabbat: Light Friday at sundown to Saturday at end of Shabbat—for the previous week Yahrzeits The following 6$^{th}$ option is only available when choosing "Use Gregorian Date"
6) Sunday at 12:00 AM through Saturday at 11:59 PM: Light Sunday at 12:00 AM through Saturday at 11:59 PM (full week)

In accordance with the preferred embodiment, the Hebrew calendar days advance at sunset the previous day. The user data includes time field that may be set to a preferred time for sundown to allow for the advancement of a new day. Furthermore, it will be appreciated by those skilled in the art, that the time of lighting may be adjusted to accommodate different preferences at which time candles may be typically lit on Saturday night.

With reference to FIG. 3, a scheduling engine 74 accesses the user data 62 and calendar and holiday data 64 within the non-volatile memory 60 and in cooperation with time and date information from the clock engine 72, signals a display engine 76 that activates the light sources. Presently the scheduling engine 74 is configured to provide activation of all light sources in response to predetermined holidays provided by the calendar and holiday data 64 and activation of individual light sources using the user data 62. The scheduling engine 74 is presently configured to advance to a new day according to the Hebrew calendar and relies upon conversion of the time and date to the Hebrew calendar information. Thus, each new day advances at a time set for sundown from the user data.

In an initial power on cycle, when power is applied to the system the display engine 76, the display engine "resets" and all light sources will be illuminated for a few seconds and then turned OFF one column at a time, starting at column 1 (left side). The display engine 76 upon receiving a signal from the scheduling engine activates the light fixtures according to the scheduling engine instructions. Furthermore, the display engine lights each light source according to the user data such as whether one or two sources are used and according to the desired brightness level. It will be appreciated by those skilled in the art that a number of circuit configurations may be used by the display engine to accomplish selected illumination of the light sources. In the preferred embodiment where the light sources are LEDs, brightness may be controlled using conventional techniques such as an op-amp voltage controlled power source to provide power to each LED or a pulse width modulation (PWM) of the voltage where brightness is adjusted according to the frequency of the "on time" of the voltage. Those skilled in the art will appreciate that other techniques may be implemented for other light sources without departing from the present invention. Different LED's with higher lumen factors may be exchanged for the present one—based on price and advances in technology. In addition, the current amber light may be changed to another color such as white.

In a presently preferred embodiment, the display engine is configured for managing up to 300 light fixtures arranged in 10 columns by 30 rows, wherein each light fixture has only one light source. However, those skilled in the art will appreciate that other configurations can be used without departing from the present invention.

For example, in an alternate embodiment, where each light fixture includes two light sources, the light sources may be varied to switch on and off over time so as to provide a light changing appearance similar to the flicker of a candle. A technique of the type suitable for this purpose is disclosed in U.S. Pat. No. 5,013,972, which is incorporated herein by reference.

Furthermore, the controller circuit includes a power controller circuit 80 that provides power to the memorial device and includes an appropriate power configuration for the controller circuit which 5 v DC power supply as well as power for the display that may be varied according to the type of light source used. In the presently preferred embodiment a power supply having an output of X volts and Y amps is presently preferred. A battery backup controller 82 is included which in the present embodiment is a battery located on the circuit to maintain the time and non-volatile memory during a temporary power outage. However, other configurations may include an Uninterruptible Power Supply (UPS) with a sufficiently sized battery to provide power to the controller circuit as well as the light sources. It will be appreciated by those skilled in the art than when a loss of power is detected and the memorial device is switched over to the battery back up that the display engine upon being notified by the battery backup controller is supplying power will enter a low power mode wherein in one embodiment the brightness level is minimized to the lowest level and the light fixtures are switch to single light source mode to preserve power. In another embodiment, the lights are completely turned off and the battery merely preserves the clock time and non-volatile memory.

With continued reference to FIG. 3, the controller circuit is configured by a remote interface device. In the preferred embodiment, the remote interface device is a computing device that connects to the controller circuit 58 of the memorial device by a two lead serial interface. Computing devices of the type suitable for this purpose may include, but are not limited to, a laptop computer, a desktop computer, a portable data assistant (PDA), and a software enhanced smart phone. A cable is supplied having appropriate plugs for connecting between the serial ports of the two devices. Presently, most computing devices include a universal serial bus (USB) plug and the connection of the communication link would include at least one USB plug for connecting to the lead to the computing device. It should be noted that other conventional communications links could be utilized without departing from the invention. The interface controller may include hard wired or wireless network controller for communication over a network using conventional network protocols of the type such as TCP/IP or Bluetooth. Thus providing remote or wireless access to the memorial device.

While the memorial device is a completely self-contained unit, which does not require any continuous or regular connection to, or communication with, another device, the remote interface device 50 provides graphical user interface engines for entering user data including an initial "set-up" engine 84 of the memorial device general configuration parameters into user data memory 85 and the entry engine 86 of data associated with each memorial plaque installed on the memorial device also into user data memory 85. Furthermore GUI test engines 87 include a lamp test engine 88 to test the lamps and date test engine 89 to test the user data on particular dates that will each be described in greater detail below with reference the graphical user interface. The term "engine" as used herein refers to software implemented on a computing device. In a preferred embodiment, the engines are performed using software that runs on any laptop/portable notebook computer using Microsoft Windows operating system or a suitable equivalent. The portable computer under the control of software creates a graphical user interface (GUI) to simplify entry of data used by the memorial device. Furthermore, to accommodate integration with other existing data files, data may be imported using a conventional file format such as, but not limited to, a CSV (comma-separated values) file.

When the memorial device has been installed and one or more memorial plaques have been mounted on the board it is time to enter the user data including "set-up" information and individual light fixture data into the controller circuit. This will be done using the GUI engines 84 and 86 created from the hardware and software of the computing device.

The initial setup screen 90 (FIG. 4A) allows for the entry of information into the memorial device in a two-step process. The set-up 92 and anniversary 94 information is first entered into the GUI, the computing device is then connected via the communications link to the memorial device, and then the information is downloaded to the memorial device.

The upper part 94 of this window 90 is a graphical representation of a segment of a memorial device. It will be used for entering individual information associated with a light fixture. The lower part 92 is used to "set-up" the general features of the memorial device. Note that the default size is a 5 column X 5 row memorial device and that the 25 plaque locations are shown in white. Rows 96 and columns 98 are numbered from bottom to top and left to right, respectively.

The user is first instructed to define the memorial device configuration that is to be programmed. In the presently preferred embodiment, this is done in the Memorial Settings box where the user "Selects" the number of rows 96 and columns 98 in the new memorial board from pull down menus configured for 10 columns and 30 rows and left click the "Apply" button 100. Active cells appear as white boxes 102 and inactive cells appear as shaded boxes 104. Note that the number of white boxes has changed to reflect the number of columns selected. To see all the white boxes 102 the user will use conventional windows scroll bars 106 and 108 to move the viewing area within the window using the scroll bars at the bottom and right side of grid.

In an alternate embodiment, the size settings could include a shape setting as well to allow for designs that are fill other geometric or fanciful shapes. A pull down menu (not shown) having a shape feature would be included where the maximum row and column numbers would conform to the shape such that not all row and columns would have equal numbers of cells. Selecting a shape would shade the cells accordingly.

In yet another embodiment, selection of active cells could be defined by conventional windows mouse selection techniques where a series of cells are highlighted by drawing a box by moving the mouse while holding the left mouse button to define a square. Individual cells could be toggled active or inactive according conventional right mouse button clicking techniques. In such instances the "apply" button would operate as a toggled edit button. For example, pressed once to show the button in a size "on" state, the user would be able to edit the active cells as described above. When pressed again to show the button in a size "off" state, the user could no longer activate or deactivate cells by clicking on the cells.

In a preferred embodiment where the Hebrew calendar is used along with the Gregorian calendar, a "Sundown Time" cell 110 is provide to set the relative local time when the Jewish calendar day advances. The default setting is 4:00 PM, but this time can be changed as appropriate using the "up" and "down" buttons associated with the time display.

The remaining general setting buttons and selections allow the user to choose from several options pertaining to the light source configuration associated with each plaque. A "lamps in use" setting 112 allows the user to select whether one 114 or two 116 light fixtures shall be used. This selection conforms with the memorial device of FIG. 1B. When a two-lamp configuration is used, the user can select different lighting effects from a pull down menu 118. The menu options include "Light Both", "Light Left" and "Light Right". Presently "Light Both" is the default selection as indicated in above screen view. A lamp brightness setting 120 allows the user to set the brightness according the ambient light requirements of the room. The default "Lamp Brightness" is "1" minimum, and is made in the display box to the right by a "left click" and selecting "1." However, if the memorial board is used in a brightly lit area or is positioned to receive direct sunlight a brighter setting maybe used. In the preferred embodiment, the user is able to select 122 when the lamps will be illuminated. The options are:

Starting 7 days before Yahrzeit:
Light 7 days before the yahrzeit ending at the end of the yahrzeit observance
Starting Shabbat before Yahrzeit:
Light the Shabbat before the yahrzeit ending at the end of the yahrzeit observance
On Yahrzeit day Only:
Light the Yahrzeit day only ending at the end of the yahrzeit observance Although these lamp settings have been provided to the Yahrzeit memorial, other light durational periods may be used when a different world calendar is used.

Having made all "Memorial Settings" choices, "right click" on the "Hide Memorial Settings" button 123. This will result in an expanded (but still limited) graphical view of the memorial device cells 94. Once the "set-up" task is completed, the user is ready to enter the user data for individual cells corresponding to individual light sources.

In an alternate preferred embodiment where like reference numerals refer to like structures, a separate menu option 109

(FIG. 4B) is included for selecting either the Hebrew calendar or the Gregorian calendar. The selection of the type of calendar alters the selection of the lamp lighting schedule.

Once the calendar has been selected, the user is able to select 122 when the lamps will be illuminated. The options are:

Starting 7 days before Yahrzeit:
Light 7 days before the yahrzeit ending at the end of the yahrzeit observance Starting Shabbat before Yahrzeit:
Light the Shabbat before the yahrzeit ending at the end of the yahrzeit observance On Yahrzeit day Only:
Light the Yahrzeit day only ending at the end of the yahrzeit observance Friday at sundown to Friday at sundown:
Light Friday at sundown to Friday at sundown
for the current week Yahrzeits (Full week)

Friday at sundown to end of Shabbat:
Light Friday at sundown to Saturday at end of Shabbat—for the previous week Yahrzeits The following option is only available when choosing the "Use Gregorian calendar" option. A menu listing 122 for the Hebrew calendar is shown in FIG. 4C and a menu listing 122 for the Gregorian calendar is shown in FIG. 4D. It should further be noted that in the preferred configuration, choosing the Gregorian calendar, the lights will turn on for the yahrzeit. The Yizkor holidays continue to be triggered when using the Hebrew calendar.

Sunday at 12:00 AM through Saturday at 11:59 PM: Light Sunday at 12:00 AM through Saturday at 11:59 PM (full week)

As stated above, although these lamp settings have been provided to the Yahrzeit memorial, other light durational periods may be used when a different world calendar is used.

Figure 4A:
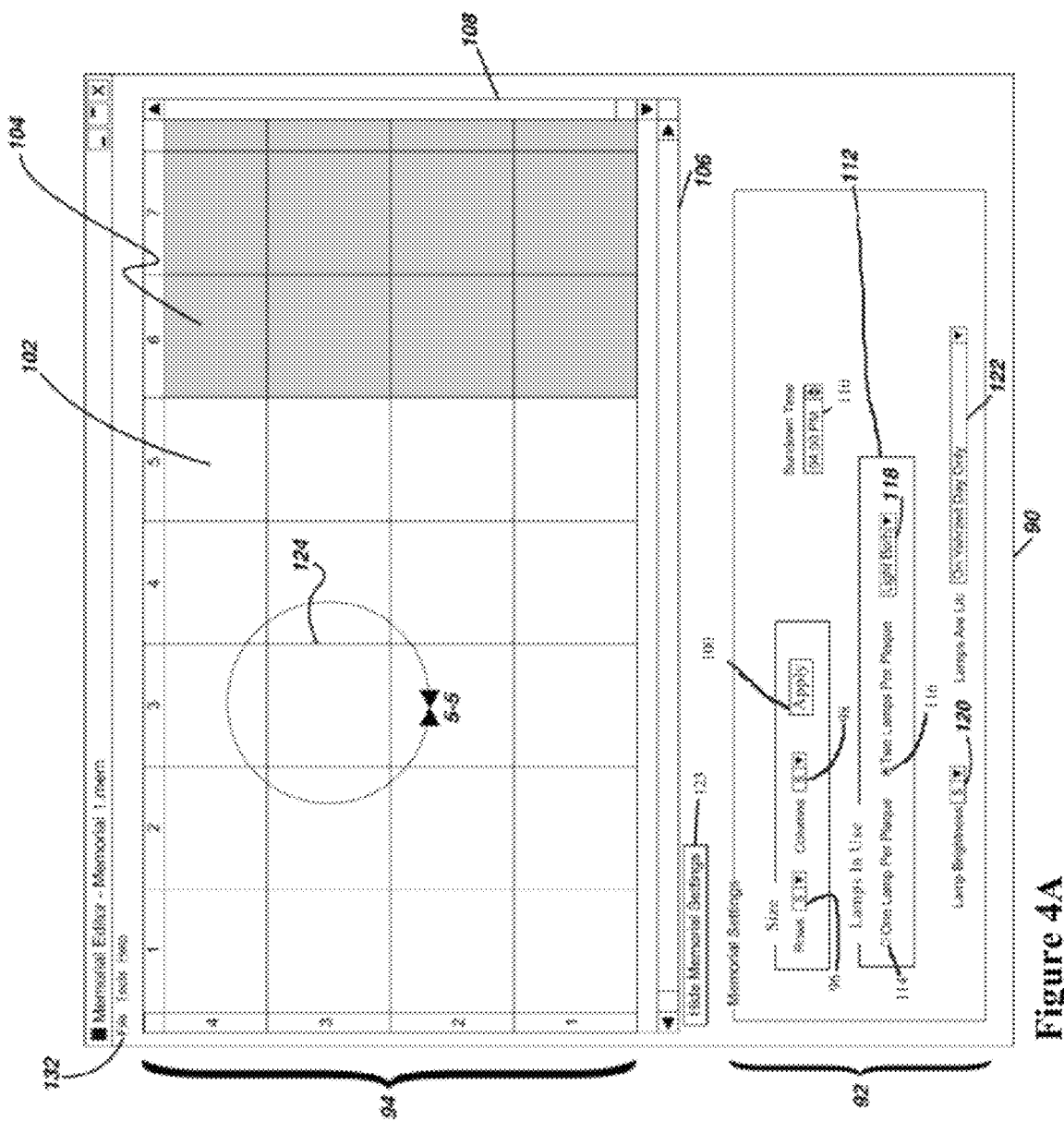
FIG. 4A is a display of a user interface of a remote interface device for configuring a memorial device according to the present invention.
Figure 4B:
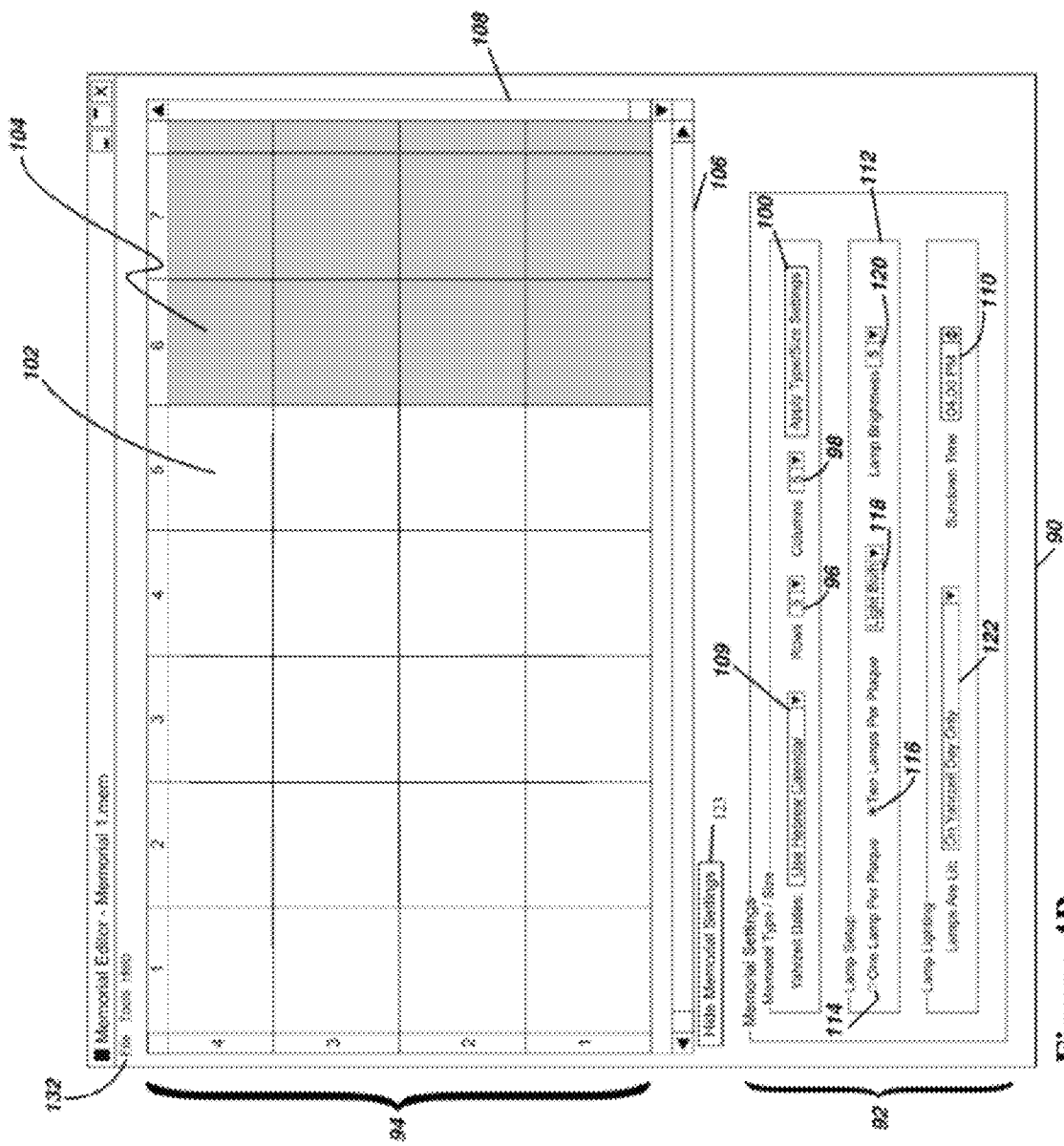
FIG. 4B is a display of a user interface of a remote interface device for configuring a memorial device according to the present invention.
Figure 4C:
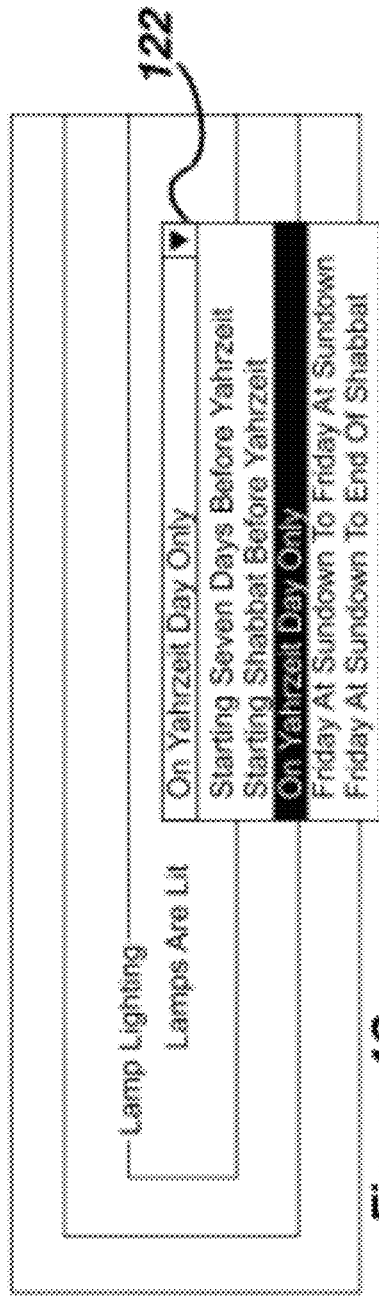
FIG. 4C is a display of a user interface of a "lamps are lit" menu of FIG. 4B.
Figure 4D:
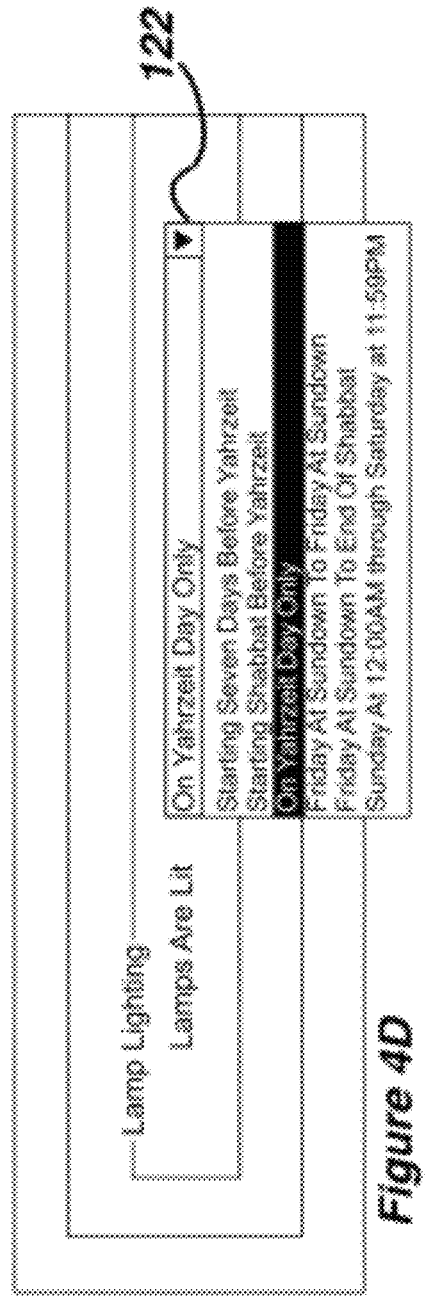
FIG. 4D is a display of a user interface of a "lamps are lit" menu of FIG. 4B.
Figure 5:
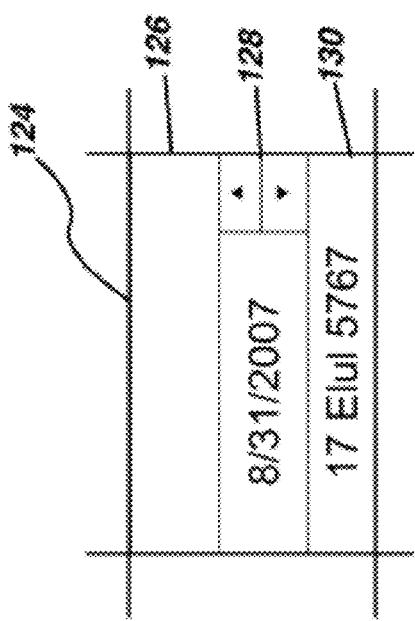
FIG. 5 is an exploded view taken along line 5-5 of FIG. 4 of an exemplary data entry according to the present invention.

With reference to FIGS. 4A and 5, individual cell data 124 is entered using the graphical user interface. All anniversary dates are entered on the graphical view of the memorial board. The user first moves the cursor (an arrow) into the rectangle 124 corresponding to the column and row of a desired cell and represents a plaque whose information is to be entered and then "Selects" this location by a (left) double-click and the user will notice that the rectangle is reconfigured into three parts 126, 128 and 130 for editing (FIG. 5). The top third 126 of the rectangle appears blank, with a vertical text cursor blinking. This portion 126 of the cell 124 is used to enter in the information shown on the plaque. In a memorial device where the plaque information is engraved or not using an LCD display, the exact information to be displayed is not necessary and initials or other corresponding information may be entered for the sole benefit of the user. The center area 128 allows for entry of the anniversary date and the default date shows the current date stored in the computing devices internal clock. The user adjusts this date to the anniversary date corresponding to the plaque memorial in a conventional time setting manner by first selecting (left click on mouse) the month and using the "up" or "down" buttons to enter the correct number and repeating this to enter the day and year. The bottom third 130 of the rectangle will always show the converted world calendar date corresponding to the entered date in portion 128. For purposes of illustration, the Hebrew calendar date is shown. As a check, the user should check that the Hebrew calendar date corresponds to the correct anniversary date.

In the presently preferred embodiment where the world calendar is Hebrew, the user should keep in mind given that the Hebrew dates in the system advance at 4 PM and the Gregorian dates advance at midnight, it may be necessary to advance the Gregorian date by one day in order to bring the Hebrew date into agreement with the anniversary date if the anniversary time occurred after 4 pm.

Figure 6:
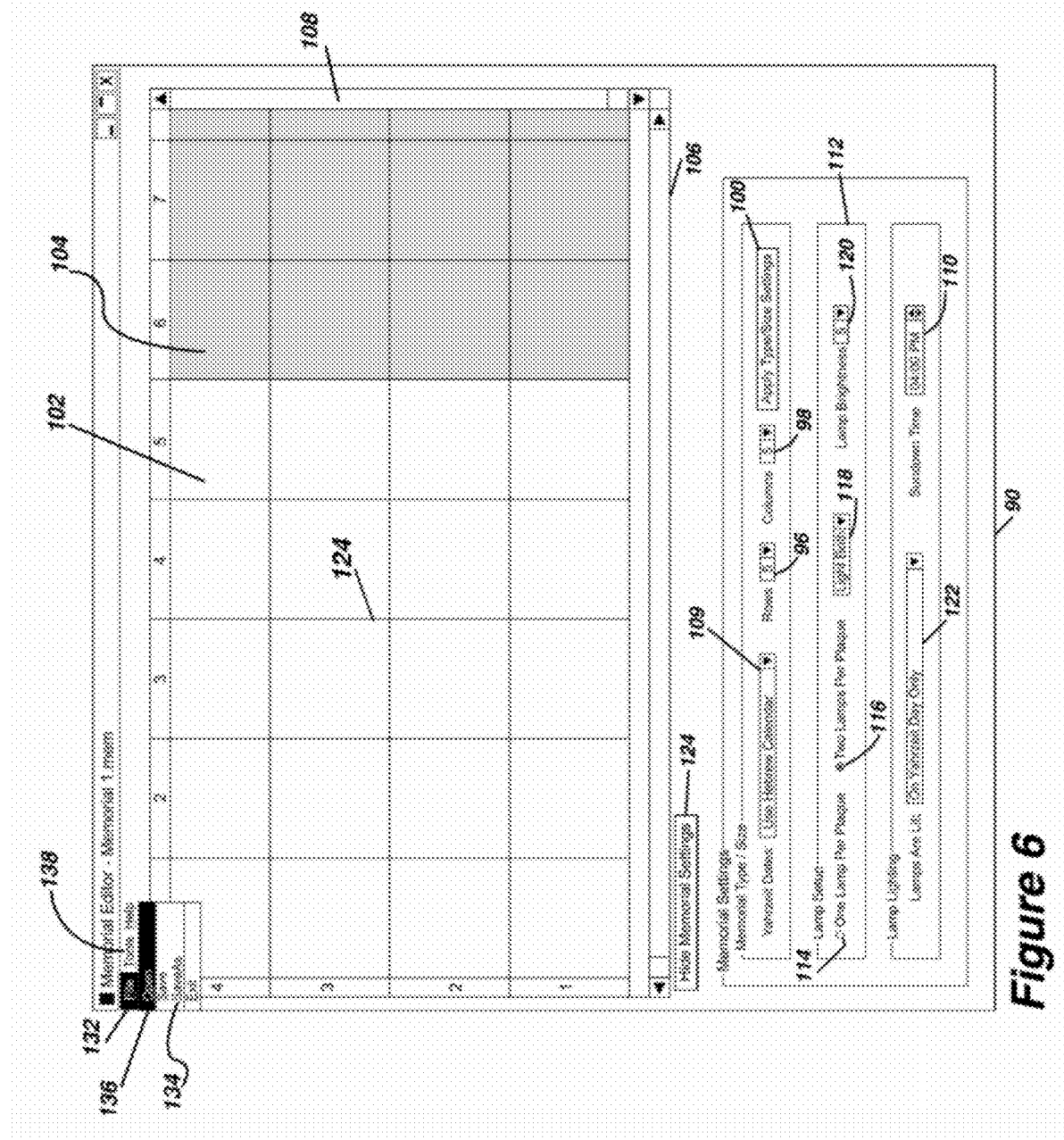
FIG. 6 is the display of the user interface for FIG. 4B showing the "File" pull-down menu.

The procedure just described should be repeated for all the cells representing plaques with active anniversary dates installed on the memorial board. Once all the anniversary information and configuration settings have been entered, the user can save the configuration information. This is done by moving the arrow cursor to the "File" heading 132, in the upper left corner of the display, left click once and select (click on) the "SaveAs . . . " option 134 (FIG. 6). The "save as" function cooperates with the windows operating system to pull up a window that allows the user to give the save information a file name and direct the program to a preferred directory selected by the user for saving the information. Preferably, all configuration files are saved with the extension ".mem" which is associated with the configuration software. Thus when a user wishes to access an existing file and selects the open option 136 from the "File" pull down menu, a window showing files in a selected directory may be limited to those files with the ".mem" extension being shown to facilitate quick access to the files.

Regardless of the user interface used, once the user data and configuration settings have been entered and saved, the user is ready to activate the communications link to the memorial device (FIG. 3). In the presently preferred embodiment, the communications link is provide by a serial cable. This cable will have a USB connector and USB to Serial Converter or an RS232 Serial connector on one end and a small stereo jack on the other end to connect the computing device to the memorial device.

Before connecting the computing device to the memorial device toggle the power to the memorial device Off and On. As this action trigger a self diagnostic test after such that after power is turned ON all the light fixtures on the memorial device will go ON and then, sequentially, they will go OFF one column at a time starting from left to right. This provides the user with a simple feedback on the operational status of the light sources. With the computing device actively running the software, the communications link is connected to the memorial device. The user then opens the saved configuration file corresponding to the present memorial device. The default screen shown in FIG. 4A or 4B will appear on the computing device.

Figure 7:
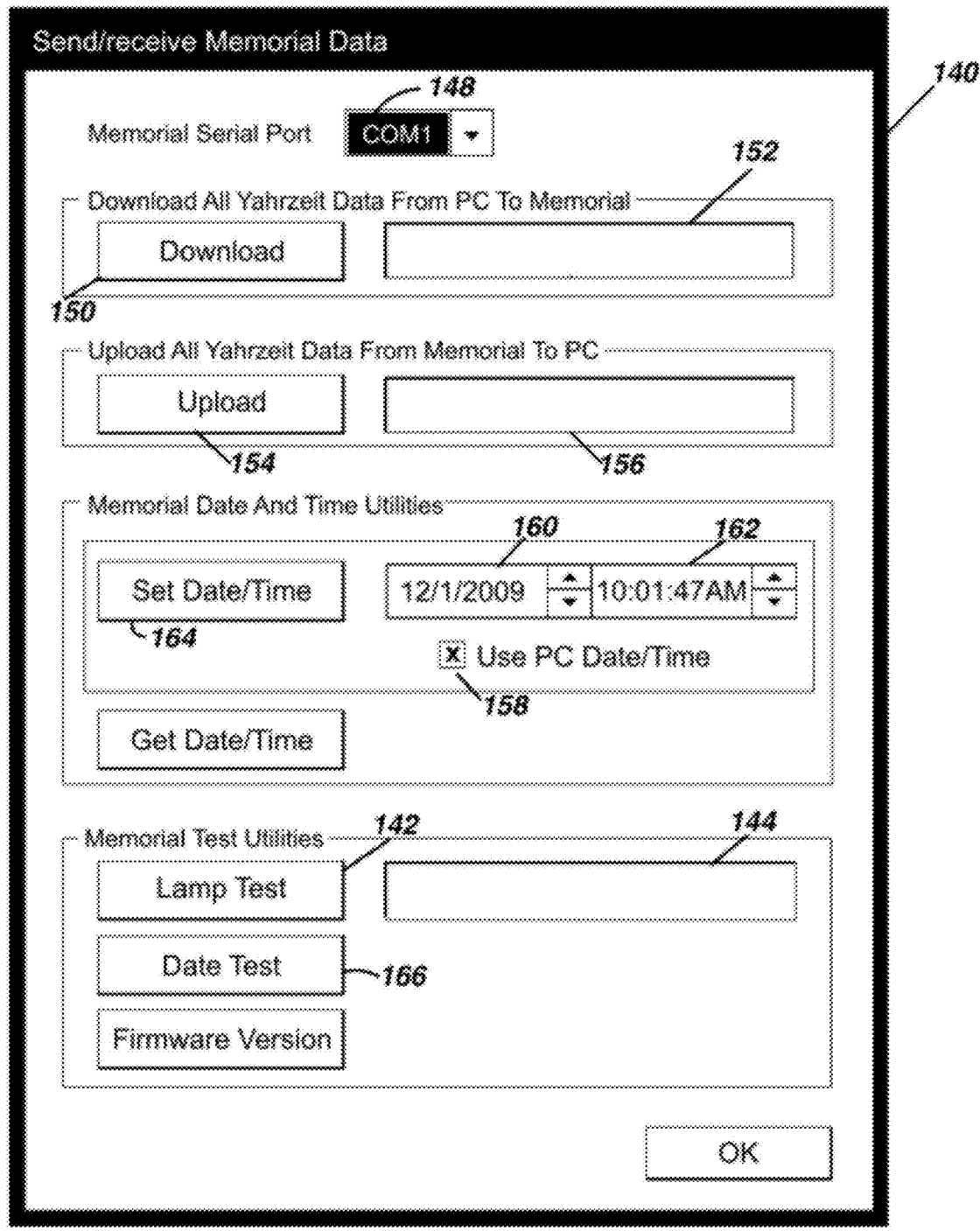
FIG. 7 is a display of a user interface of a remote interface device for communicating with a memorial device according to the present invention.
Figure 8:
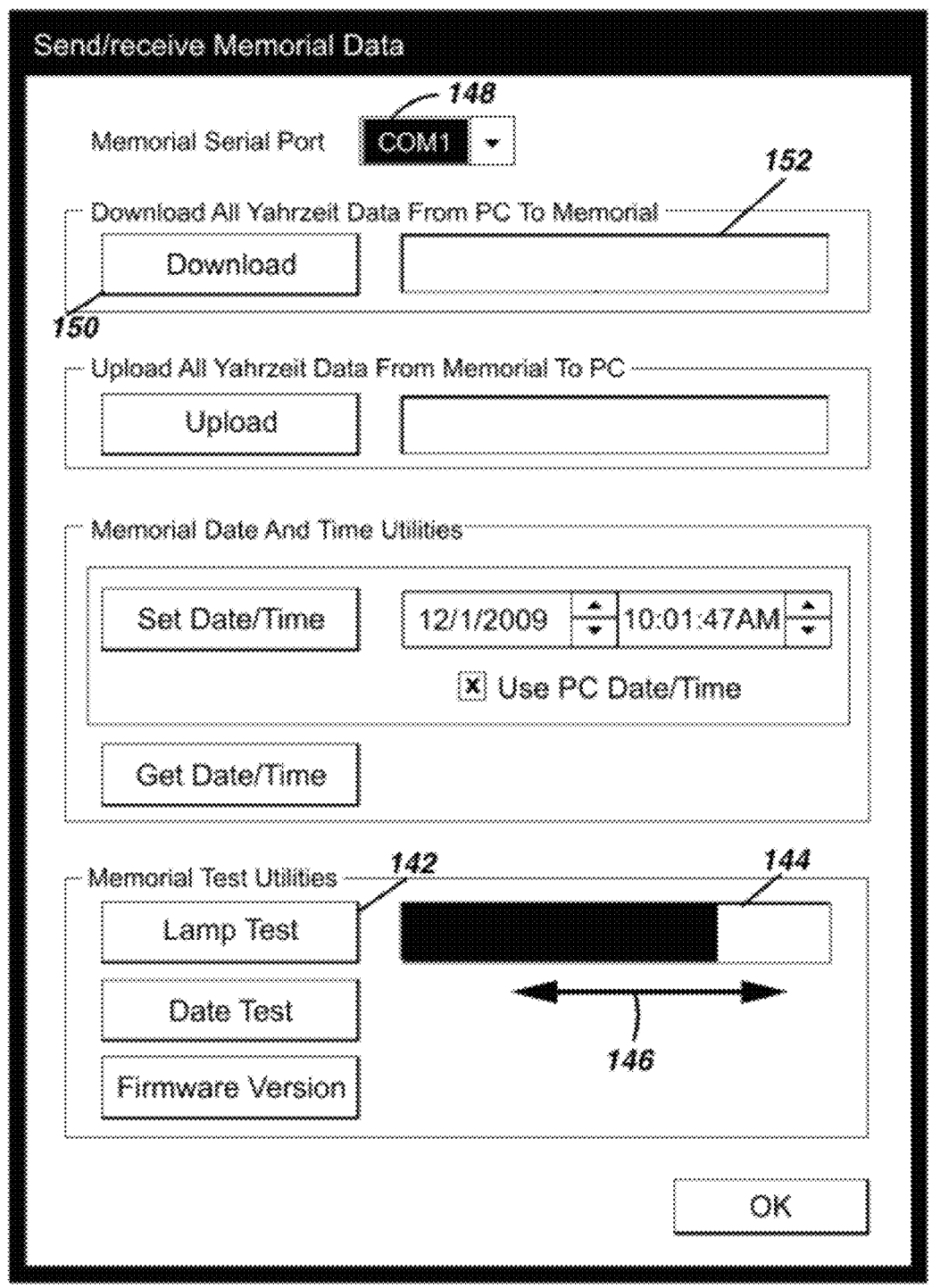
FIG. 8 is the display of the user interface of FIG. 7 showing a lamp test operation in progress according to the present invention.

On the screen upper left corner, the user clicks the "Tools" 138 pull down menu and then clicks on a "Send/Receive Memorial Data . . . " item that appears (not shown). A communications window 140, FIG. 7, will now appear on top of the prior window. In order to confirm the communications is active, the user can select the "lamp test" 142 that will indicate that the remote interface device and memorial device are communicating with each other. If a bar 144 "grows" and "shrinks" from left to right as shown by arrow 146 (FIG. 8) adjacent to the button, and all light fixtures 24 (FIG. 1) go "ON" for about ten seconds and then "OFF" sequentially from left to right then the communication is working fine. If there is a possibility that the communications link is not working, an error message will appear. The user can recheck the communications link cable. Furthermore, a pull down menu 148 allows the user to select the serial port associated with the cable. Depending upon which port the user selects or the configuration setting of the computing device, the user may need to change the communications port.

To ensure that any communications problem has been resolved, the user can repeat the Lamp Test 142 (FIG. 7) until it runs properly. For other configurations using network or Bluetooth settings alternate conventional techniques to establish a communications link can be used. Such as checking a network router to ensure the memorial device is recognized and has an address on the network or synchronizing the devices according to conventional Bluetooth procedures.
Once the communications link has been established, the user can exchange information between the remote interface device and the memorial device.

1. Download All Yahrzeit Data from PC to Memorial

A mouse click on the Download button 150 transfers data from the remote interface device to the interface controller of the memorial device. The anniversary data for each cell and memorial device settings that were previously entered will now be downloaded to the memory as the user data. A progress bar 152 will slowly change, to the right of the button, indicating that data transfer is occurring. After the data download is completed, any light fixtures that are illuminated will be associated with plaques indicating anniversary dates that are in progress in accordance with the anniversary date duration selected.

When additional anniversary plaques are added to the memorial device it will be necessary to update the data stored in the memory with the new information corresponding to the physical location of the plaque, the name of the deceased and the anniversary date.

2. Upload All Anniversary Data from Memorial to PC

As a back up to the saved memorial device file on the computing device operating as the remote interface device, the memorial device information can be retrieved from the memorial device itself. A mouse click on the Upload button 154 will begin this operation. This function may be used any time that the users wish to check the user data including the memorial settings that are currently stored in the memory. A progress bar 156 will slowly "grow" to the right of the button to indicate that data transfer is occurring.

3. Set the Date and Time Used by the Clock Engine

This function is done automatically each time a communications link is established when the little "Use PC Date/Time" box 158 is "checked." This is the default case and assumes that that the computing device time is set to the correct date and time.

The user can always select the internal clock/calendar time and date manually by unchecking the box 158 and the user will note that the check mark disappears and date and time boxes 160 and 162 are "active." The current date is entered by selecting (with the mouse) the month, day and year and either keying in the correct values or by advancing the indicated value up or down by using the UP or Down buttons to the right of the date. Similarly, the time of day is entered. Immediately after this is done, click on the "Set Date/Time" button 164.

The user may check the date and time used by the memorial device by selecting "Get Date/Time" will display this information from the internal calendar/clock's.

4. The "Memorial Test Utilities"

The user is provided with diagnostic tools that allow for the user to quickly detect light source or configuration issues.

(1) The user can quickly and easily check operation of the light sources on the device by checking the "Lamp Test" 142. As described above this test is also useful for checking whether a proper communications link has been established.

Figure 9:
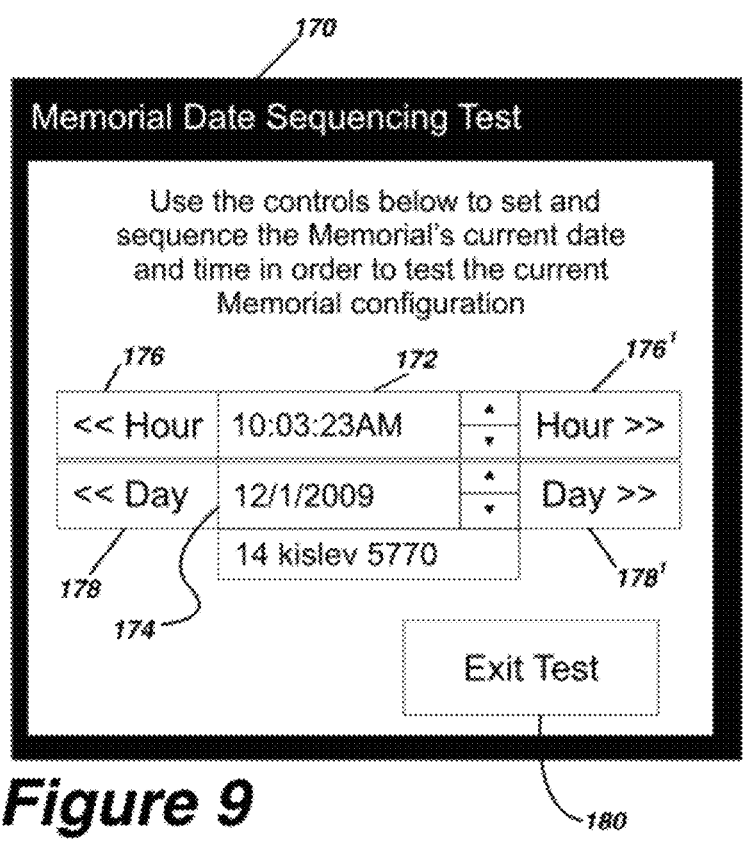
FIG. 9 is a display of a user interface of a remote interface device for date sequence testing of a memorial device according to the present invention.

(2) Another useful utility for testing the scheduling engine 74 (FIG. 3) using the user data and calendar and holiday data is the "Date Test" 166. When its button 166 is "clicked" a "Memorial Date Sequencing Test" window 170, FIG. 9, will open.

The current time of day 172 and the date 174 shown are obtained from the clock engine of the memorial device. By using the mouse, the user can adjust the Hour and Day buttons 176 and 178 and the hour and day of the clock engine will be advanced or turned-back to correspond to the new time selected. The user can incrementally and sequentially pass through certain dates and hours to ensure proper configuration of the memorial device. Similarly, specific dates and times can be selected in the same manner described for manually setting the Date and Time above; however, changes to the time and date in this window are not permanently stored in the memory of the memorial device.

Using this utility, the user can check for proper operation of the light fixtures associated with any specific plaque, or on all programmed plaques on the holiday dates. When finished, the user can exit the test using an "Exit Test" button 180. In the Hebrew calendar as well as in the Gregorian calendar, the holiday dates in which all light sources are active include the four Yizkor dates. These dates are: 22 Nisan (8th day of Passover), 7 Sivan (2nd day of Shavuot), 10 Tishrei (Yom Kippur), and 22 Tishrei (Shemini-Atzeret).

Following diagnostic testing, the remote interface device may be disconnected from the memorial device by disconnecting the communications link and turning of the software program. The memorial device will then continue to operate according to the selected parameters.

With reference to FIG. 3, the remote interface device 50 may be connected and used to manage at least one, but also multiple memorial devices 52, 54 and 56, where the remote interface device is in active communication with only one memorial device at a time. It should be noted that where the communications link is provided in the form of a network interface, that memorial devices may be configured remotely and operated as part of a third party maintenance service.

In an alternatively preferred embodiment, a controller 200 connects to the remote interface 202 via a communications link 204 and memorial display 206 includes a plurality of light bars 208 connected by a serial bus 210 to the controller 200 that can be used easily rewire an existing light display housing (not shown) or configure a new housing design (not shown). Each bar includes a plurality of individually addressable lights 212 controlled by a latch circuit 214 that is responsive to the controller 200 to activate or deactivate each light when it is addressed. Each light is preferably an LED wired into a circuit board. The light bars are designed to be arranged vertically as columns with up to "N" number of rows and each bar 208 includes preferably five lights 212 wherein each light is spaced approximately 1 to 2 inches apart to permit alignment with an existing design. The spacing may be on tailored to the needs of an existing or new design. Presently, a preferred spacing that conforms to most conventional memorial designs is two inches. However, this should not be considered limiting as any appropriate spacing may be used without departing from the invention. Perforations 216 are included in the light bar 208 to permit the lights to be snapped off as needed for a desired configuration. Breaking of the circuit board nearest the perforation has no effect of the lights nearest the latch circuit 214, but permanently removes the excess removed lights from the light bar. Additionally, a light bar (not shown) may include complementary grooved rails disposed in between the perforations into which the tongue leads of the LED can be inserted to allow for the LED supported by the leads to slide within respective rails. This further allows for a degree of adjustment to be made should the spacing of the LEDs in a column vary. In the presently preferred embodiment the light bars can be used as a unit of 5 light sources or easily shortened to a minimum of 1 or 2 light sources allowing for columns of various lengths, where a minimum 3 light sources is presently preferred. The circuit board is manufactured with perforations for easily breaking off the desired number of lights to the desired combination without damaging the integrity of the light bar electronics. To obtain the preferred 30×10 array of 300 lights, 10 strings of up to 6 light bars may be connected to the controller.

It will be appreciated by those skilled in the art that the software may be configured to allow the user to have many more lighting options all preconfigured on the user interface. Such configurations may include, but are not limited to, allowing the user to choose by deceased if they want to memorialize by the Gregorian or the Hebrew calendar.

As used throughout this specification it should be noted that:

Light Fixture—refers to a location on a memorial device where on or more light sources may be located to provide a single light.

Light Source—refers a low voltage light such as, but not limited to, an LED.

Light Bar—refers to a plurality of light sources or lights disposed on a printed circuit board in spaced apart relation where individual or clustered lights or light sources may also be referred to as light fixtures.

Lights—refers to one or more light sources clustered together on a light bar.

Lamp—is a term from the user interface that depending upon the configuration used can refer to light fixtures, light sources and/or lights.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A memorial display system comprising:
    at least one memorial device having a plurality light fixtures;
    each light fixture having at least one light source;
    a controller in electrical communication with each of said at least one light source that automatically activates and deactivates said at least one light source;
    said controller includes memory having stored therein at least one anniversary date that corresponds to at least one light fixture and an anniversary duration indicating the time period that the anniversary is observed;
    said at least one memorial device includes at least one plaque having indicia printed near said at least one light fixture wherein the indicia provides anniversary information;
    said controller further includes a display engine for illuminating the at least one light fixture; and
    said controller is operative to illuminate the light fixture via said display engine corresponding to an anniversary date and a duration period stored in said memory.

2. The system of claim 1 wherein said controller includes a diagnostic engine that illuminates all light fixtures.

3. The system of claim 2 wherein said diagnostic engine illuminates all light fixtures according to a pre-determined pattern.

4. The system of claim 3 wherein said diagnostic engine illuminates all light fixtures sequentially according to a pre-determined pattern that is visually recognizable to a user and readily indicates a light source failure.

5. The system of claim 1 wherein said controller includes a battery to maintain clock date and time and said memory is non-volatile.

6. The system of claim 1 wherein said at least one fixture includes a plurality of light sources for varying the illumination from said at least one fixture using said display driver.

7. The system of claim 6 wherein said plurality of light sources include light features selected from the group consisting of color and luminosity.

8. The system of claim 1 wherein the memorial display system includes:
    a remote interface device that includes engines to provide user data to the controller including anniversary date information; and
    a communications link connecting the remote interface device to the memorial device controller.

9. The system of claim 8 wherein the communications link is selected from the group consisting of a electrical cable interface link, a wireless interface link, an internet communications link and any combination thereof.

10. The system of claim 8 wherein said remote interface device includes diagnostic tools for testing said at least one memorial device including testing of at least one light source and testing of anniversary dates to activate the at least one light source at appropriate times.

11. The system of claim 8 wherein said at least one memorial device includes a plurality of memorial devices and said remote interface device engines provide user data to a plurality of controllers, each selectively in signal communication with said remote interface device via said communications link.

12. The system of claim 8 wherein said at least one memorial device includes a plurality of light fixtures arranged in a visual pattern and said remote interface device includes a configuration engine that permits configuration of user data entry in a visual arrangement that matches said visual pattern of light fixtures.

13. The system of claim 8 where said at least one memorial device includes an interface controller to exchange data with said remote interface device.

14. The system of claim 8 wherein remote interface device includes a set-up engine to establish basic parameters for interfacing with said at least one memorial device.

15. The system of claim 8 wherein said remote interface device includes test engines for test said at least one memorial device.

16. The system of claim 15 wherein one of said test engines is a lamp test engine.

17. The system of claim 15 wherein on of said test engines is a date test engine.

18. The system of claim 1 wherein said at least one plaque includes an electronic display for reproducing said indicia.

19. The system of claim 1 wherein said controller is operative to illuminate a portion of all light fixtures according to at least one predetermined date.

20. The system of claim 19 wherein said portion of all light fixtures is all light fixtures.

21. The system of claim 19 wherein said controller said at one predetermined date is at least one religious holiday.

22. The system of claim 21 wherein said controller follows the Hebrew calendar and acknowledges that a new day starts at sunset.

23. The system of claim 22 wherein said at least one religious holiday is a Jewish Holiday.

24. A memorial display system comprising:
    at least one memorial device having a plurality of light fixtures;
    each light fixture having at least one light source;

at least one light bar supporting a plurality of said at least one light source, where each of said at least one light source is individually addressable;
a latch circuit responsive to an address corresponding to one of said at least one light sources supported by said at least one light bar to activate or deactivate said corresponding at least one light source;
a controller in electrical communication with said latch circuit on said at least one light bar that automatically activates and deactivates said at least one light source;
said controller includes memory having stored therein at least one anniversary date that corresponds to at least one light fixture and an anniversary duration indicating the time period that the anniversary is observed.

25. The system of claim 24 wherein said at least one light bar includes said plurality of at least one source are spaced apart corresponding the spacing of light fixtures.

26. The system of claim 25 wherein said at least one light bar is perforated at locations in between said plurality of at least one light source to permit the elimination of a portion of said lights.

27. The system of claim 25 including a plurality of light bars wherein some boards connect to the controller in series and some light bars connect to the controller in parallel to form an array of light sources.

28. The system of claim 27 wherein said memorial display is configured for a manual lighting circuit and forms an array of lighting fixtures and said light bars are connected to said controller to form array corresponding to said array of light fixtures.

* * * * *